Oct. 16, 1951     B. F. KEIPER     2,571,455
CUTTING TOOL
Filed Jan. 5, 1949
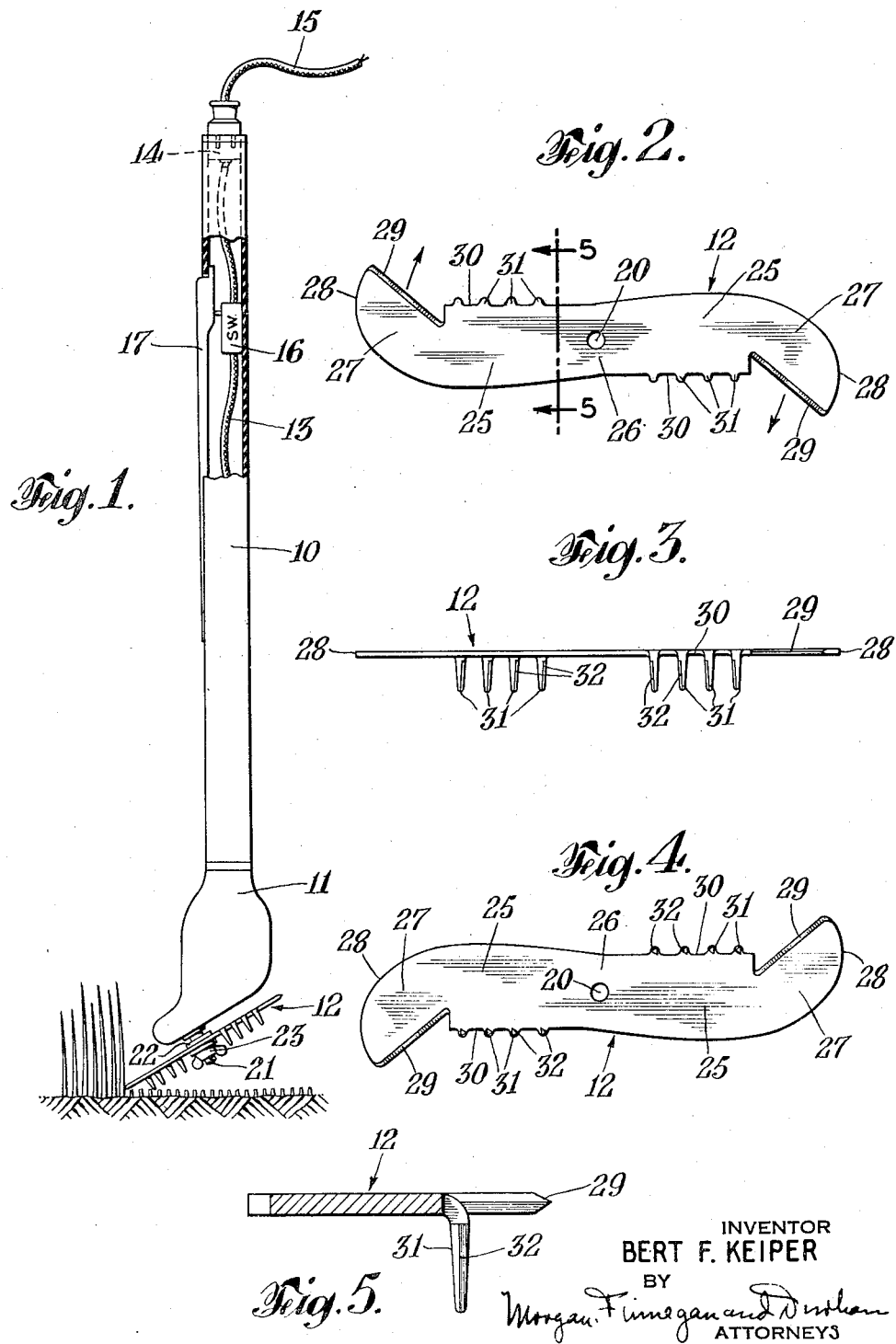
INVENTOR
BERT F. KEIPER Patented Oct. 16, 1951

2,571,455

UNITED STATES PATENT OFFICE 2,571,455

CUTTING TOOL

Bert F. Keiper, Needham, Mass.

Application January 5, 1949, Serial No. 69,269

6 Claims. (Cl. 30—347)

The present invention relates to a grass and weed cutting tool and more particularly to an easily portable tool for trimming small patches of lawn and at the edges of lawn.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a side elevation of a typical and illustrative embodiment of the portable tool of the invention;

Fig. 2 is a plan view of the cutter blade shown at the bottom of the assembled tool of Fig. 1;

Fig. 3 is a side elevation of the cutter blade shown in Fig. 2;

Fig. 4 is a bottom view of the blade shown in Figs. 2 and 3; and

Fig. 5 is a cross-sectional view taken along line 5—5 of Fig. 2.

The present invention has for an object the provision of an efficient, easily portable, powered cutting tool which is particularly adapted for cutting grass and weeds and the like in places where it is difficult or impossible to reach with the conventional lawn mower. Such places, for instance, may be adjacent the foundation of a house, along flower beds and walks, around rocks, etc., and the tool is equally useful for cutting patches of lawn too small to make use of the conventional mower desirable. A further object is the provision of such a cutting tool that is sure in its cutting of grass and weeds, can be handled with one hand without the necessity of lifting and adjusting the grass with the other before cutting, and which itself reaches and cuts fallen and matted grass. Still another object is the provision of a cutting tool which is relatively simple in its construction and operation, is not easily damaged by accidental contact with hard objects such as stones or concrete, and may easily be repaired and sharpened. The invention further provides a portable cutting tool which may be conveniently used from an upright position, and may be readily positioned for greatest cutting efficiency.

Referring now in detail to the illustrative embodiment of the invention shown by way of example in the accompanying drawings, the portable tool comprises generally a longitudinally extending handle 10 the bottom of which terminates in a casing 11 wherein a suitable power means such as an electric motor of small horsepower is positioned, and a cutter blade indicated generally by the numeral 12 at the bottom of the casing to be rotationally driven by the power means within casing 11. Wiring 13 extends through the hollow interior of the handle 10 to the electric motor in casing 11, and a suitable socket 14 is positioned in the upper end of the handle for convenient detachable connection with electric wiring 15 from a suitable source. A switch 16 is provided in the handle wiring 13 to be used for starting and stopping the motor. As embodied, the switch 16 is actuated by a resilient lever 17 extending a substantial distance along the length of handle 10 as shown, so that the switch may be conveniently actuated by the hand of the operator in a variety of positions on the handle.

The cutter blade 12 for the tool comprises a longitudinally extended body having an aperture 20 centrally of its length and width whereby it may be mounted upon the driven shaft 21 of the motor housed within casing 11. A flange 22 (Fig. 1) is fixed with respect to shaft 21 forming a shoulder against which the blade 12 may be tightened by means of nut 23 on the end of shaft 21, whereby the blade is rotationally driven by the shaft and may be quickly and easily detached therefrom.

The cutter blade 12 comprises, a shown, a pair of integral, identically formed, half-blade portions 25 one positioned to either side of the central aperture 20 of the blade. Each such blade-half portion comprises a body part 26 nearer the rotational axis of the blade and an end portion 27 outwardly thereof. The end portions 27 are provided with rounded outer end contours 28 and, at the leading edges of such end portions, the direction of rotation being that indicated by the arrows in Fig. 2 of the drawings, straight, sharpened cutting edges 29 are provided. Said cutting edges are inclined at an angle of about 45° with respect to the longitudinal axis of the blade, and are protected to some extent from damage by rocks and other hard objects approached in cutting by the rounded end contour 28, which extends further radially outwardly than the cutting edge.

The leading edges 30 of the body parts 26 of the blade carry a plurality of downwardly extending fingers 31 which are sharpened along their leading edges 32, as best shown in Fig. 5 of the drawings. In operation, the cutting edges 29 of the blade will efficiently cut the relatively upright grass and weeds, while the sharpened fingers 31 will loosen and cut the fallen, matted and entangled growth.

The cutting tool of the invention is adapted to be carried and operated by a person in an upright position and is readily manœuvered from such position. It also can be easily used from a bending or kneeling position, and the extended switch lever 17 makes such use convenient. The construction of the tool is light for efficient handling. The blade 12 may preferably be made of a single blank of relatively light sheet steel, for instance, cut to give the contours shown and with the edges 29 sharpened. The fingers 31 may be integral pieces of the blank, downwardly turned as shown and then turned to present the thickness of the blank as leading edges, suitably sharpened for cutting.

In use the portable cutting tool of the invention may be carried with the shaft 10 substantially upright, whereby the cutter blade 12 occupies a position of from about 30° to 50° angular relationship with respect to the ground since the cutter blade is preferably mounted at an angular relationship with respect to the handle 10 of about 40° to 60°. However, it will be apparent that the tool may be readily manœuvered to bring the central part of the cutter blade closer to the ground, in which case the fingers 31 are further effective to cut low-lying and tangled grass and weeds.

The invention in its broader aspects is not limited to the specific mechanisms shown and described but departures may be made therefrom, within the scope of the accompanying claims, without departing from the principles of the invention and without sacrificing its chief advantages.

What I claim is:

1. A cutter blade for a grass cutting tool, comprising a flat, longitudinally extending body adapted to be rotated about an axis centrally of the length thereof said body having sharpened portions along the leading edges thereof and fingers extending from said body substantially normally thereto.

2. A cutter blade for a grass cutting tool, comprising a flat, longitudinally extending body adapted to be rotated about an axis centrally of the length thereof said body having sharpened portions along the leading edges thereof and fingers extending from said leading edges substantially normally to said flat body.

3. A cutter blade for a grass cutting tool, comprising a flat, longitudinally extending body adapted to be rotated about an axis centrally of the length thereof said body having sharpened portions along the leading edges thereof and fingers extending from said leading edges substantially normally to said flat body, said fingers having sharpened leading edges.

4. A cutter blade for a grass cutting tool, comprising a flat, longitudinally extending body adapted to be rotated about an axis centrally of the length thereof said body having sharpened portions along the leading edges thereof inclined with respect to the longituidnal axis of said body and fingers extending from said body substantially normally thereto.

5. A cutter blade for a grass cutting tool, comprising a flat, longitudinally extending body adapted to be rotated about an axis centrally of the length thereof said body having sharpened portions along the leading edges thereof inclined with respect to the longitudinal axis of said body, rounded ends extending radially outwardly of said sharpened portions, and fingers extending from said body substantially normally thereto.

6. A cutter blade for a grass cutting tool, comprising a flat, longitudinally extending body adapted to be rotated about an axis centrally of the length thereof said body having sharpened portions along the leading edges thereof inclined with respect to the longitudinal axis of said body and fingers extending from said leading edges radially inwardly of said sharpened portions and substantially normally to said flat body.

BERT F. KEIPER.

REFERENCES CITED

The following references are of record in the file of this patent:

UNITED STATES PATENTS

| Number | Name | Date |
| --- | --- | --- |
| 1,550,342 | Cogley | Aug. 18, 1925 |
| 1,569,987 | Lamberti | Jan. 19, 1926 |
| 1,582,359 | Trowbridge | Apr. 27, 1926 |
| 1,954,579 | Smith | Apr. 10, 1934 |
| 2,091,827 | Mercatoris | Aug. 31, 1937 |
| 2,153,771 | Orr | Apr. 11, 1939 |
| 2,197,561 | Orr | Apr. 16, 1940 |
| 2,242,524 | Hunt | May 20, 1941 |
| 2,427,265 | Dreischerf | Sept. 9, 1947 |